US009063030B2

(12) United States Patent
Slemp

(10) Patent No.: US 9,063,030 B2
(45) Date of Patent: Jun. 23, 2015

(54) APPARATUS AND METHOD FOR VISUALIZING THE POSITION OF A ROTATING STRUCTURE WITH RESPECT TO A STATIONARY STRUCTURE

(75) Inventor: Mark W. Slemp, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 583 days.

(21) Appl. No.: 13/396,217

(22) Filed: Feb. 14, 2012

(65) Prior Publication Data

US 2013/0207974 A1 Aug. 15, 2013

(51) Int. Cl.
*G06T 17/00* (2006.01)
*G01M 13/04* (2006.01)

(52) U.S. Cl.
CPC .................... *G01M 13/045* (2013.01)

(58) Field of Classification Search
USPC ........... 345/420, 418, 649–659; 382/151–153
See application file for complete search history.

(56) References Cited

U.S. PATENT DOCUMENTS

| 4,059,972 A | 11/1977 | Beam, Jr. et al. |
| 6,889,096 B2 | 5/2005 | Spriggs et al. |
| 7,717,013 B2 | 5/2010 | Hildebrand et al. |

FOREIGN PATENT DOCUMENTS

| EP | 575155 A1 * | 12/1993 |
| WO | WO 2008049167 A1 * | 5/2008 |

OTHER PUBLICATIONS

Lazarus, A., B. Prabel, and D. Combescure. "A 3D finite element model for the vibration analysis of asymmetric rotating machines." Journal of Sound and Vibration 329.18 (2010): 3780-3797.*
Emerson Process Management, CSI 6500 Machinery Health Monitor, Eddy Current Displacement Transducer Specifications Sheet, Jan. 2011. 5 pgs.
Bourgeois et al., Low Cost Multiplane Balance of a Gas Turbine Auxiliary Driveshaft, Turbomachinery International, Mar./Apr. 2003, www.turbomachinerymag.com.
Tony Dematteo, Phase analysis: Making vibration analysis easier, 4X Diagnostics, LLC.
Douglas G. Stadelbauer, Balancing of Rotating Machinery, Harris' Shock and Vibration Handbook, 5th Edition, McGraw-Hill, 2002, 40 pgs.
A.S. Rangwala, Balancing of Rotors, Structural Dynamics of Turbo-Machines, Dec. 1, 2008, 359-396, New Age International Pvt. Ltd. Publishers.

(Continued)

*Primary Examiner* — Ke Xiao
*Assistant Examiner* — Whitney Pointe
(74) *Attorney, Agent, or Firm* — Luedeka Neely Group, P.C.

(57) ABSTRACT

A computer-animated graphical model visually conveys the movement and vibration of an entire shaft rotating within its bearings, and the behavior of the shaft at each individual bearing. The model aids a user in (1) visualizing an animated three-dimensional mode shape of a modeled shaft at high speeds, (2) visualizing the alignment state of the bearings of a modeled shaft at slower speeds, (3) visualizing the axial movement of a modeled shaft relative to a stationary component, and (4) visualizing the relationship between a rotating element, such as rotor, and a stationary element, such as a rotor housing, at locations other than the bearing locations. The model enables a user to compare shaft behavior at different operating conditions during a transient event, to see if a shaft is running at a proper position within its bearings, and to see if a shaft is contacting bearing surfaces or is dangerously close to such contact.

16 Claims, 9 Drawing Sheets

(56) References Cited

OTHER PUBLICATIONS

Kim Alan Lovejoy et al., Balancing of Large Tandem-Compound Turbines Using Vectoral Shift Data Analysis by Personal Computer, Feb. 16, 1996, 1-11, Lovejoy Controls Corporation, Waukesha, WI.

Stan Bognatz, Transient Speed Vibration Analysis, Insights into Machinery Behaviour, Dec. 7, 2007, 1-47. M & B Engineered Solutions, Inc., www.mbesi.com.

Dr. Thomas J. Chalko, Turbine-Pack—a software for comprehensive vibration analysis of multi-bearing rotor bearing foundation systems (RBF) with animated graphic user, 4 pgs., 2000. http://sci-e-research.com/tpak.html.

Shinkawa Sensor Technology, Inc., VK-A Series Transducer Model VK-452A Transducer Instruction Manual, Mar. 1997, 1-50. Japan.

National Instruments, Orbit, Timebase, and Shaft Centerline Plots (Sound and Vibration Measurement Suite), Dec. 2007, 1-4, http://zone.ni.com/reference/en-XX/help/372416A-01/svtconcepts/obt_tbs_shctln/.

A.W.Lees et al., Multi-Plane Balancing of a Rotating Machine Using Run-Down Data, Proc. of 21st IMAC, Paper No. 230, Feb. 2003. 1-6.

Prosig, Multi-Plane Balancing, 25 pgs. www.hoskinscientifique.com.

Joy P. Francis, Diagnosing a Steam Turbine, 2009, 36-43, Orbit vol. 29 No. 1. Equate Petrochemical Company.

MachineLibrary™ and Dynamic Stiffness: An Animated Tutorial, Orbit, Second Quarter, 2000.

\* cited by examiner

APPARATUS AND METHOD FOR VISUALIZING THE POSITION OF A ROTATING STRUCTURE WITH RESPECT TO A STATIONARY STRUCTURE

FIELD

This invention relates to the field of monitoring moving components of a machine. More particularly, this invention relates to a system for modeling and visualizing the position and vibration of a rotating shaft using signals from synchronized radial displacement probes located at multiple bearing locations along the shaft.

BACKGROUND

In a power-producing steam turbine, the turbine shaft is usually supported at multiple locations along its length by sleeve bearings. A sleeve bearing's inner diameter is slightly larger than the outer diameter of the shaft so as to provide clearance for shaft rotation. For example, the inner diameter of the bearing may be 0.010 inch larger than the outer diameter of the shaft, thereby providing a clearance of 0.005 inch between the shaft and the bearing when the shaft is centered in the bearing.

When a shaft is rotating at its nominal operating speed, the shaft usually rides on a hydrodynamic wedge of oil between the bearing and the shaft. If the shaft develops an abnormal vibrational mode while rotating, the outer surface of the shaft may contact the inner surface of the bearing and cause damage to the shaft and the bearing. To avoid such situations, it is important for operational personnel to be able to monitor the position of a rotating shaft with respect to the surfaces of the sleeve bearings in which it rotates.

What is needed, therefore, is a tool for providing a visual depiction of a shaft rotating within multiple sleeve bearings, which depiction indicates the relative spacing between the outer surface of the shaft and the inner surfaces of the bearings and indicates the average center line of the shaft at each bearing location.

SUMMARY

The above and other needs are met by a comprehensive, computer-animated graphical model that conveys the movement and vibration of an entire shaft within its bearings, as well as a clear picture of the shaft behavior at each individual bearing. Various embodiments of the invention aid a user in (1) visualizing an animated three-dimensional mode shape of a modeled shaft at high speeds, (2) visualizing the alignment state of a modeled shaft's bearings at slower speeds, (3) visualizing the axial movement of a modeled shaft relative to a stationary component, and (4) visualizing the relationship between a rotating element, such as rotor, and a stationary element, such as a rotor housing, at locations other than bearing locations. Embodiments of the invention enable a user to compare shaft behavior at different operating conditions during a transient event, to see if a shaft is running at a proper position within its bearings, and to see if a shaft is contacting bearing surfaces or is dangerously close to such contact.

One preferred embodiment provides a system for generating a computer-displayable solid model representation of movement of a rotating structure with respect to a first stationary structure and a second stationary structure over a period of time. The first and second stationary structures are disposed near the rotating structure and are spaced apart from each other along a central rotational axis of the rotating structure. The system of this embodiment includes a modeling software application executed by a computer processor. The computer processor accesses displacement data indicative of a spatial relationship between the rotating structure and the first and second stationary structures.

The displacement data includes first x-axis data, first y-axis data, second x-axis data and second y-axis data. The first x-axis data is indicative of a distance in a first x-axis between a first surface of the rotating structure and a surface of the first stationary structure that is adjacent the first surface of the rotating structure. The first y-axis data is indicative of a distance in a first y-axis between the first surface of the rotating structure and the surface of the first stationary structure. The second x-axis data is indicative of a distance in a second x-axis between a second surface of the rotating structure and a surface of the second stationary structure that is adjacent the second surface of the rotating structure. The second y-axis data is indicative of a distance in a second y-axis between the second surface of the rotating structure and the surface of the second stationary structure.

The modeling application includes computer-executable instructions which, when executed:
  process the first x-axis data and the first y-axis data to determine first positions of the central rotational axis of the rotating structure with respect to the surface of the first stationary structure as the rotating structure rotates during a first time range during the time period;
  process the first positions of the central rotational axis to determine a first average position of the central rotational axis during the first time range;
  process the second x-axis data and the second y-axis data to determine second positions of the central rotational axis of the rotating structure with respect to the surface of the second stationary structure as the rotating structure rotates during the first time range;
  process the second positions of the central rotational axis to determine a second average position of the central rotational axis during the first time range;
  generate an inner solid model surface connecting the first average position of the central rotational axis with the second average position of the central rotational axis;
  generate an outer solid model surface connecting the first positions of the central rotational axis with the second positions of the central rotational axis;
  generate first and second stationary solid model surfaces representing the surface of the first and second stationary structures; and
  generate the solid model representation of the movement of the rotating structure with respect to the first and second stationary structures during the first time range, where the solid model representation is displayable on a computer display device The solid model representation includes the first stationary solid model surface, the second stationary solid model surface spaced apart from the first stationary solid model graphical surface, the inner solid model surface extending between the first stationary solid model surface and the second stationary solid model surface, and the outer solid model surface extending between the first stationary solid model surface and the second stationary solid model surface.

In some embodiments, the first positions of the central rotational axis during the first time range form a first ring of data points encircling the first average position of the central rotational axis, and the second positions of the central rotational axis during the first time range form a second ring of data points encircling the second average position of the central rotational axis. The inner solid model surface comprises an inner tube extending between and connecting the first average position and the second average position of the central rotational axis. The outer solid model surface comprises an outer tube extending between and connecting the first and second rings of data points, and this outer tube surrounds the inner tube.

In another aspect, the invention provides a method for generating a computer-displayable solid model representation of movement of the rotating structure with respect to the first and second stationary structures. A preferred embodiment of the method includes the following steps:
(a) generating first x-axis data indicative of a distance in a first x-axis between a first surface of the rotating structure and a surface of the first stationary structure that is adjacent the first surface of the rotating structure;
(b) generating first y-axis data indicative of a distance in a first y-axis between the first surface of the rotating structure and the surface of the first stationary structure;
(c) generating second x-axis data indicative of a distance in a second x-axis between a second surface of the rotating structure and a surface of the second stationary structure that is adjacent the second surface of the rotating structure;
(d) generating second y-axis data indicative of a distance in a second y-axis between the second surface of the rotating structure and the surface of the second stationary structure;
(e) determining, based on the first x-axis data and the first y-axis data, first positions of the central rotational axis of the rotating structure with respect to the surface of the first stationary structure as the rotating structure rotates during a first time range during the time period;
(f) determining, based the first positions of the central rotational axis, a first average position of the central rotational axis during the first time range;
(g) determining, based on the second x-axis data and the second y-axis data, second positions of the central rotational axis of the rotating structure with respect to the surface of the second stationary structure as the rotating structure rotates during the first time range;
(h) determining, based on the second positions of the central rotational axis, a second average position of the central rotational axis during the first time range;
(i) generating an inner solid model surface connecting the first average position of the central rotational axis with the second average position of the central rotational axis;
(j) generating an outer solid model surface connecting the first positions of the central rotational axis with the second positions of the central rotational axis;
(k) generating a first stationary solid model surface representing the surface of the first stationary structure;
(l) generating a second stationary solid model surface representing the surface of the second stationary structure;
(m) generating the solid model representation of the movement of the rotating structure with respect to the first and second stationary structures during the first time range; and
(n) displaying the solid model representation on a computer display device.

The solid model generated in step (m) includes the first stationary solid model surface, the second stationary solid model surface spaced apart from the first stationary solid model graphical surface, the inner solid model surface extending between the first stationary solid model surface and the second stationary solid model surface, and the outer solid model surface extending between the first stationary solid model surface and the second stationary solid model surface.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
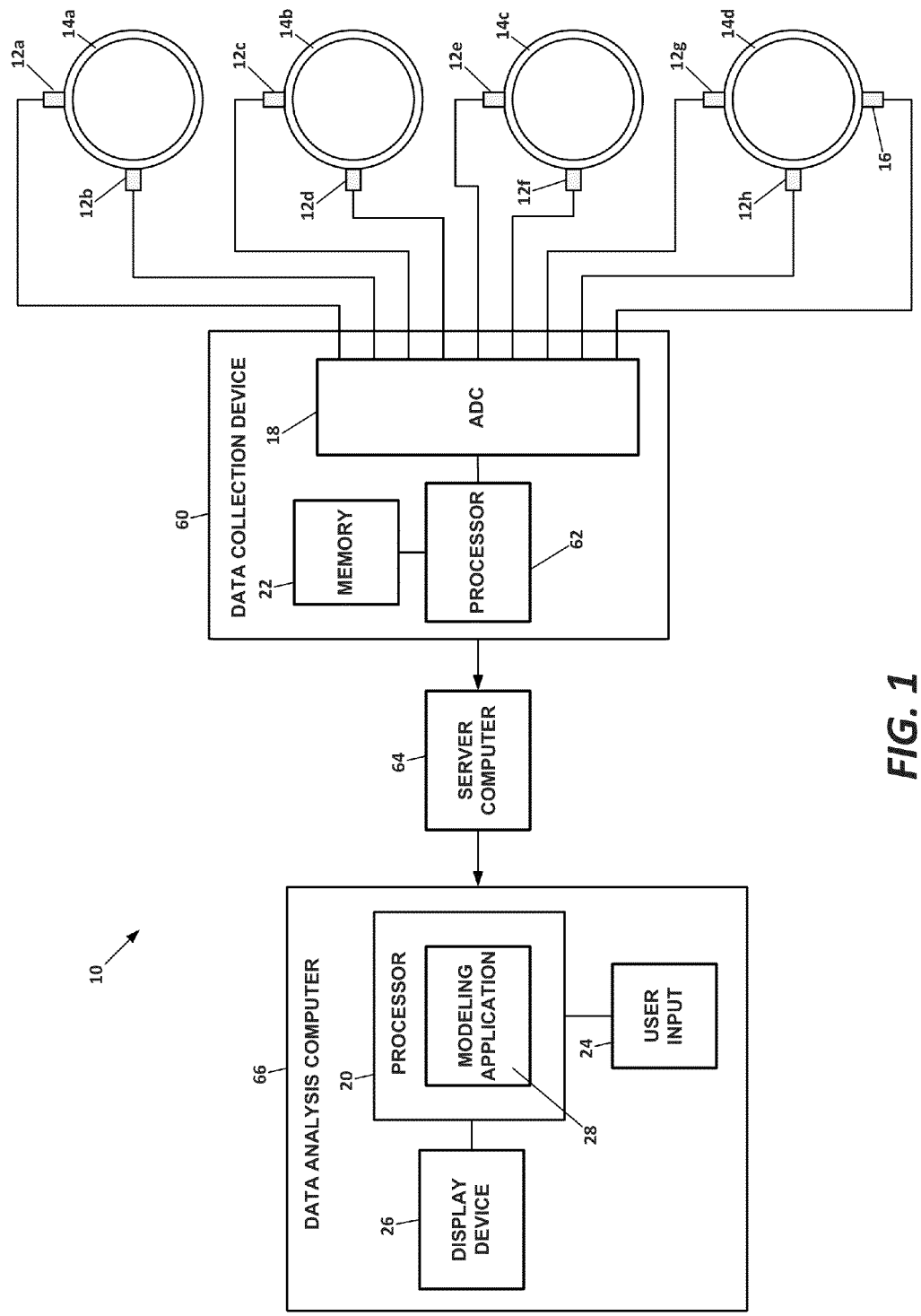
FIG. 1 depicts a system for modeling shaft vibration according to an embodiment of the invention.

Alignment and balance are terms commonly applied to a single plane rotor such as a disk. Once advantage provided by various embodiments described herein is the ability to visualize motion of even a complex rotor having two, three, four, or more bearing rings analogous to multi-plane balancing or alignment. The embodiments provide for visualization of relative motions between rotor and bearings at multiple locations along the centerline, and interpretation of these aspects in comparison with one times turning speed (1×RPM) or two times turning speed (2×RPM) or sub-synchronous turning speed events. It is advantageous to visualize rotation of a rotor along the length of the rotor to permit the slow motion visualization of a machine. This supplements measured faults with visual confirmation and provides explanation and interpretation for some peculiarities or other anomalies which come to the attention of a vibration analyst.

Shaft imbalance is often a fault affecting vibration amplitude at 1×RPM with relatively small contributions to axial thrust. Imbalance is a condition of a rotating component where the center of rotation is not the same as the center of mass, and the difference between them is eccentricity. Imbalance is often caused by material buildup, wear, improper assembly, poor design, or thermal distortions.

Shaft misalignment is an anomalous condition in which a rotational centerline of at least a portion of a shaft or a rotor is not collinear with another portion of the shaft or rotor, or is not collinear with one or more bearing centerlines. Misalignment commonly refers to a lack of collinear alignment of centerlines across a flexible coupling or other interface such as a journal, lack of collinear alignment between a shaft centerline to bearing centerline, or between one bearing centerline and another bearing centerline. Misalignments when a shaft is stationary may be quite different from misalignments when the shaft is rotating. Factors contributing to these differences include thermal distortion (also called thermal growth), shaft straightness, rotor straightness, platform stability, journal bearing fluid forces, and other bearing constraints. Angular misalignment is a fault likely to contribute to vibration at 1×RPM as well as vibration at 2×RPM and axial thrust. Offset misalignment is a fault likely to affect vibration mainly at 2×RPM.

Imbalance, misalignment, and looseness are three of the most common faults in rotating machinery. Each of these problems is associated differently with multiples of turning speed. Looseness, rub, or other physical interferences typically do not affect vibrations at either 1×RPM or 2×RPM in the same way as does either misalignment or imbalance. Instead, these problems often produce sub-synchronous vibration and add noise to the overall vibration signal. Sleeve bearing faults, such as a wiped bearing or a damaged journal, may potentially affect a centerline or a dynamic motion of a rotor or a shaft rotation. Embodiments of the invention described herein aid an operator in discerning, either automatically or by user interpretation, between sub-synchronous, 1×RPM, and 2×RPM anomalies, and thereby derive an understanding of the cause of an anomalous condition. For example, at 1×RPM the operator may see an eccentric motion once per revolution in the 3-dimensional animation of the shaft. The operator could discern the frequency of the vibration relative to the rotation of the tachometer indicator. If the eccentric motion or vibration occurs once for every rotation of the tachometer indicator, then the operator would suspect a problem associated with sub-synchronous vibration. Eccentric motion occurring twice per revolution of the tachometer indicator would suggest misalignment. Looseness would be indicated by a very erratic motion.

Embodiments described herein use program logic to compute relative phase, amplitude, and/or periodicity of the movement of a shaft centerline relative to a bearing or other stationary structure. The program logic interprets this information, and displays a graphical image interpretation using highlighting or color differences or exaggerated displacement. In this way, the program logic provides visual information displayed with a shaft centerline plot to assist an operator in discerning between different anomalous conditions, such as angular-misalignment, offset-misalignment, looseness, and imbalance.

Embodiments described herein are useful in visualizing various resonances as a shaft or rotor turns at different speeds. A rotor must sometimes pass through a rigid body first critical resonance as it runs up to speed. Some rotors negotiate second, third, or even higher order critical resonances as they proceed to operating speed. Typically this is an expected dynamic condition. As such, each critical resonance or other known resonance is cautiously negotiated by the operator responsible for running a rotor up to operating speed. Various embodiments described herein assist the operator in seeing dynamic rotation, bearing clearances, centerline precessions, and anomalous motions as a function of running speed. With such visualization information, an operator is better able to avoid destructive actions that are common in startup and shutdown of rotating machinery such as turbine rotors.

Additionally, there are many operating speed dependent faults, such as oil whirl, oil whip, lubrication problems, process or other flow problems, and dynamic functioning machine conditions that are characteristic to a specific machine or process. Like resonance, these other speed dependent faults may be better avoided using a shaft centerline visualization technique as provided by the various embodiments described herein.

Figure 3:
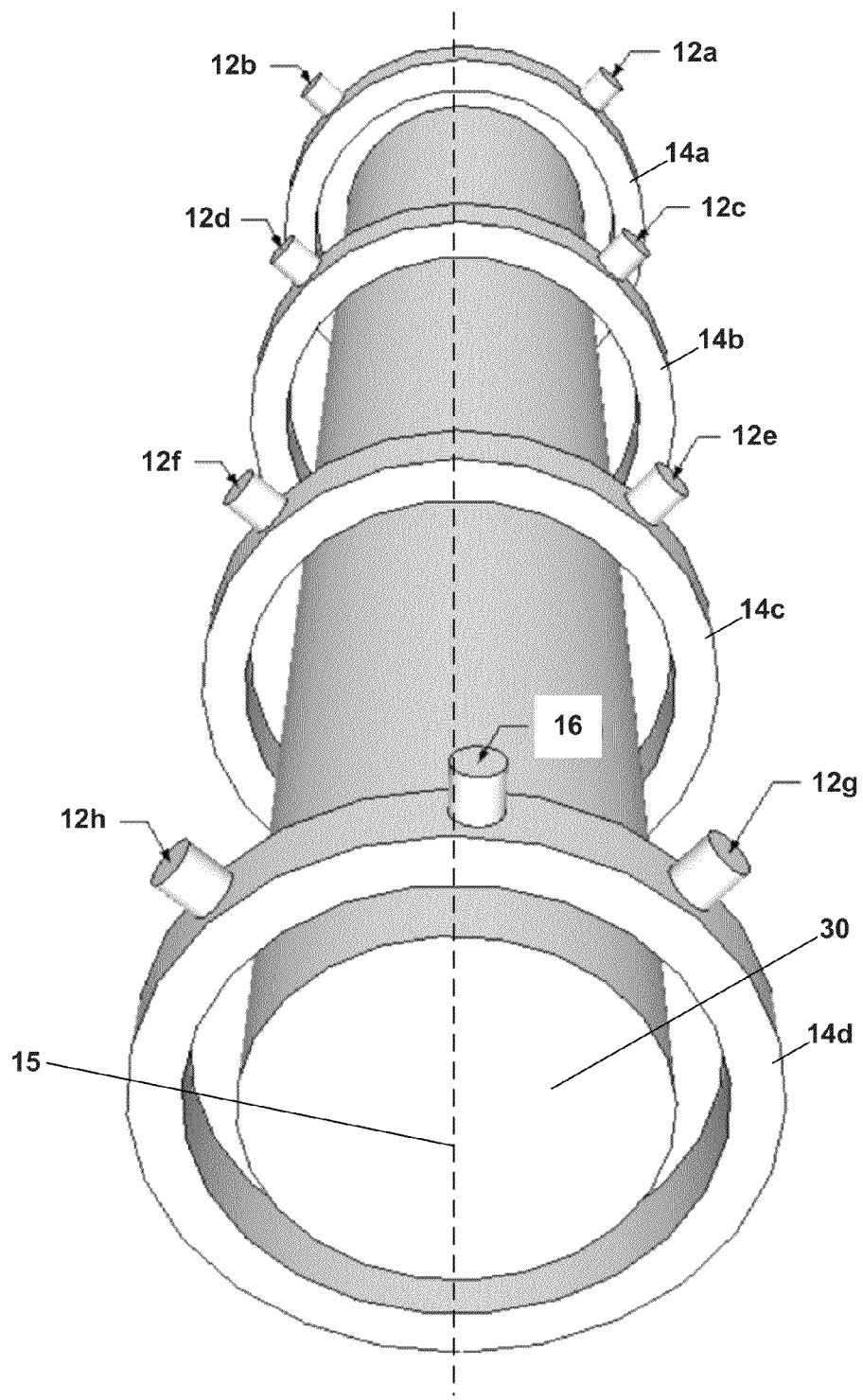
FIG. 3 depicts a shaft disposed within sleeve bearings and orthogonally positioned displacement probes according to an embodiment of the invention.

Referring now to FIGS. 1 and 3, a system 10 is depicted for modeling displacement and vibration of a shaft 30 rotating about a rotational axis 15. The system 10 includes pairs of displacement sensors 12*a*-12*b*, 12*c*-12*d*, 12*e*-12*f*, and 12*g*-12*h* attached to sleeve bearings 14*a*, 14*b*, 14*c* and 14*d*. These sensors are disposed on displacement axes that are referred to herein as the x-axis (horizontal axis) and y-axis (vertical axis). In a preferred embodiment, all of the y-axis sensors (12*a*, 12*c*, 12*e* and 12*g*) are aligned with each other, and all of the x-axis sensors (12*b*, 12*d*, 12*f* and 12*h*) are aligned with each other, so that the output signals are rotationally synchronized. These displacement sensors may also be referred to herein as proximity sensors, proximity probes, proximity transducers, displacement transducers, or displacement probes. In one preferred embodiment, the displacement sensors are non-contact eddy current transducers which provide a voltage output signal that is proportional to the distance between the tip of the transducer and the surface of the shaft 30. Examples of such sensors are model number PR 6423 manufactured by Epro GmbH and model number VK-452A manufactured by Shinkawa Sensor Technology, Inc.

In preferred embodiments described herein, the two displacement sensors in each pair are oriented at 90 degrees with respect to each other. However, it will be appreciated that the sensors may be oriented at other angles, so long as the angle is known.

The system 10 also includes a tachometer sensor 16 which generates an output signal indicating the rotational speed of the shaft. Since the rotational speed of the shaft is the same at all of the bearing locations, only one tachometer sensor is needed to perform the processes described herein.

The outputs of the displacement sensors 12*a*-12*h* and the tachometer sensor 16 are electrically connected to the inputs of an analog-to-digital converter (ADC) 18 of a data collection device 60, such as the CSI 4500 or CSI 6500 Machinery Health™ Monitor manufactured by Emerson Process Management. Preferably, the ADC 18 has a 24-bit resolution, greater than 100 dB dynamic range, and samples the sensor output voltages at a rate of 5120 samples per second. The digital displacement signal data and tachometer signal data at the output of the ADC 18 are provided to a processor 62 of the data collection device 60 which maintains the data in memory 22 until it is downloaded for analysis.

In a preferred embodiment, the data collection device 60 is in communication with a server computer 64 on which the data from the sensors 12*a*-12*h* are occasionally archived in long-term storage for subsequent analysis. In some embodiments, the server computer 64 communicates with the data collection device 60 via a communication network, such as an Ethernet network, Wi-Fi network, or Virtual Private Network. In other embodiments, the data collection device 60 may connect directly to the server computer 64 via a USB serial link or other data link.

As shown in FIG. 1, a data analysis computer 66 is in communication with the server computer 64 via a communication network, such as an Ethernet network, Wi-Fi network, or Virtual Private Network. The data analysis computer 66 may be a personal computer, a server, a laptop, or tablet computer. The data analysis computer 66 includes a processor 20 operable to execute instructions of a modeling software application 28 as described in more detail hereinafter. The data analysis computer 66 also preferably includes a user input device 24, such as a keyboard, mouse, touchpad or touchscreen, and a display device 26.

Figure 4:
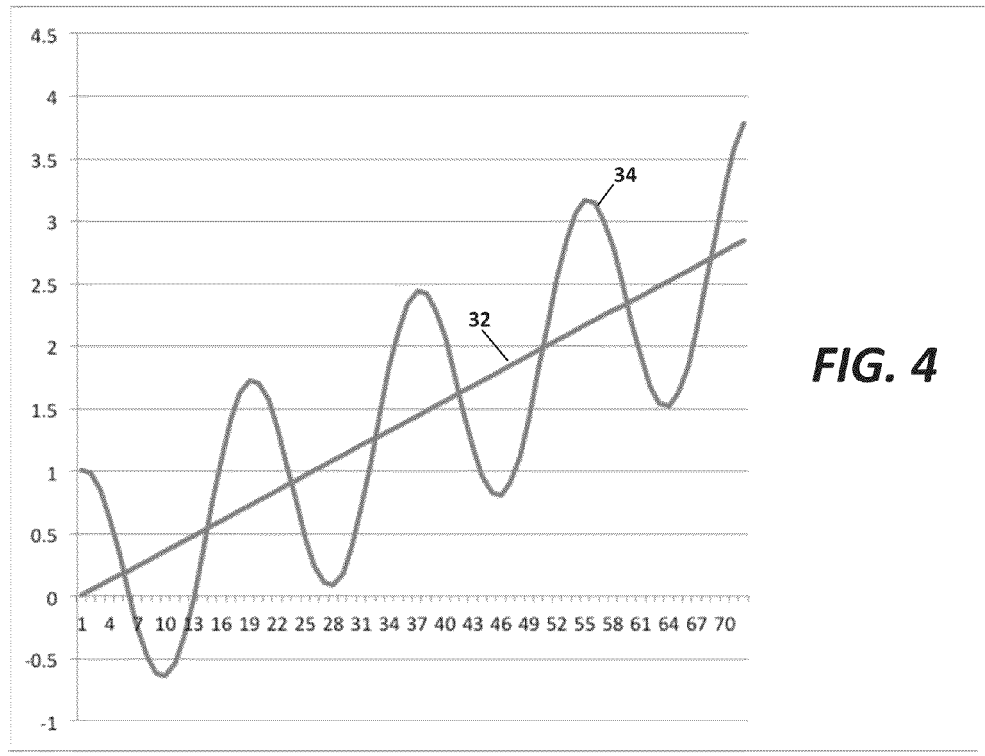
FIG. 4 depicts AC and DC components of a displacement probe signal.

As shown in FIG. 4, the output signal from each displacement probe can be represented as a "DC component" 32 and an "AC component" 34. The DC component 32 represents the average shaft position relative to the corresponding displacement sensor and the AC component 34 represents the absolute shaft position relative to the corresponding displacement sensor. In physical terms, for each single rotation of the shaft, it has an average center position (DC component) and an absolute center position (AC component) oscillating about the average center position. An imbalance in the shaft is a typical cause of this dynamic oscillation.

To determine an actual shaft position relative to any of the pairs of sensors, the voltages produced by the pair of sensors when the shaft is stationary or turning very slowly are needed. This is referred to as a sensor's resting voltage and is one of the setup values used in the graphing process described herein. The resting voltage is subtracted from a measured voltage to determine the change in the shaft position compared to its resting state. This change in position typically involves the shaft lifting off the bottom surface of the bearing and becoming supported by a hydrodynamic wedge of oil as the shaft's rotational speed increases.

Figure 5:
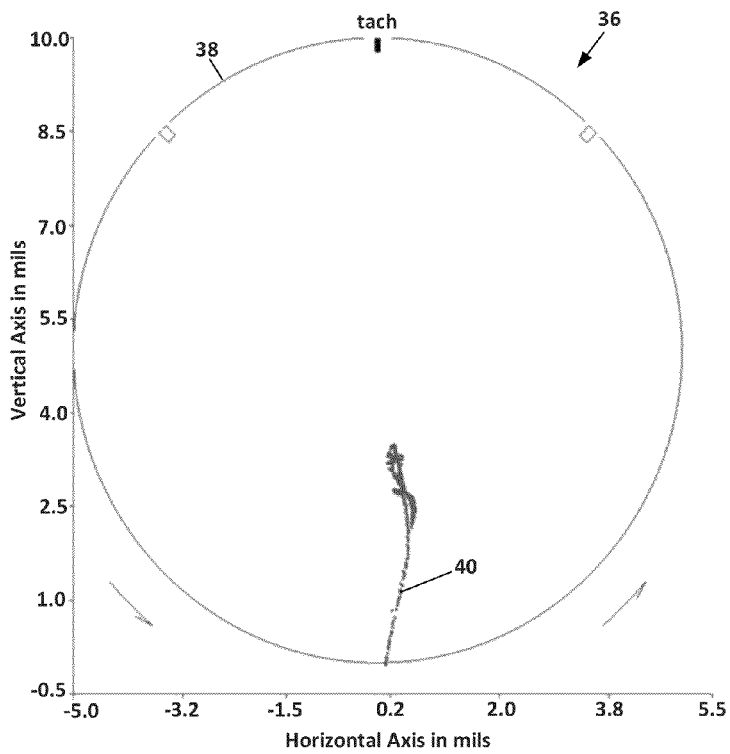
FIG. 5 depicts an average shaft centerline plot.

FIG. 5 shows an average shaft centerline plot 36 measured at a single bearing position over a period of time. The circle 38, also referred to herein as the "clearance circle," represents the clearance between the outer surface of the shaft and the bearing. In the example of FIG. 5, the inner diameter of the bearing is 0.010 inch greater than the outer diameter of the shaft. Thus, the nominal bearing clearance for this example is 0.005 inch. If the shaft were in the exact center of the bearing, there would be a single data point in the center of the clearance circle 38, indicating a clearance of 0.005 inch in every direction between the outer surface of the shaft and the inner surface of the bearing. Thus, the shaft centerline plot 36 represents the shaft as a single point indicating the location of the shaft center. The nominal bearing clearance is one of the setup values needed for the graphing process described herein.

With continued reference to FIG. 5, the data points 40 at the very bottom of the plot indicate the shaft at rest, with the outer surface of the shaft touching the bottom surface of the bearing (no clearance between shaft and bearing). As the rotational speed of the shaft increases, the shaft becomes supported by the oil wedge as it rises up from the bottom surface of the bearing. This change in average position is reflected by the trail of data points 40 extending upward from the bottom of the clearance circle 38 as shown in FIG. 5.

FIG. 5 does not indicate the dynamic motion of the absolute shaft center position with respect to the average shaft center position as the shaft rotates. This dynamic motion is indicated by the AC components of the orthogonal displacement probe signals (FIG. 4). These dynamic components are represented in the orbit plot 42 shown in FIG. 6. The data points 44 in the orbit plot 42 indicate how the shaft center moves dynamically about an average center position as the shaft rotates. Several rotations of the shaft (8-10) are depicted in the plot 42. However, the plot 42 provides no information about the position of the shaft relative to the bearing surfaces.

Figure 6:
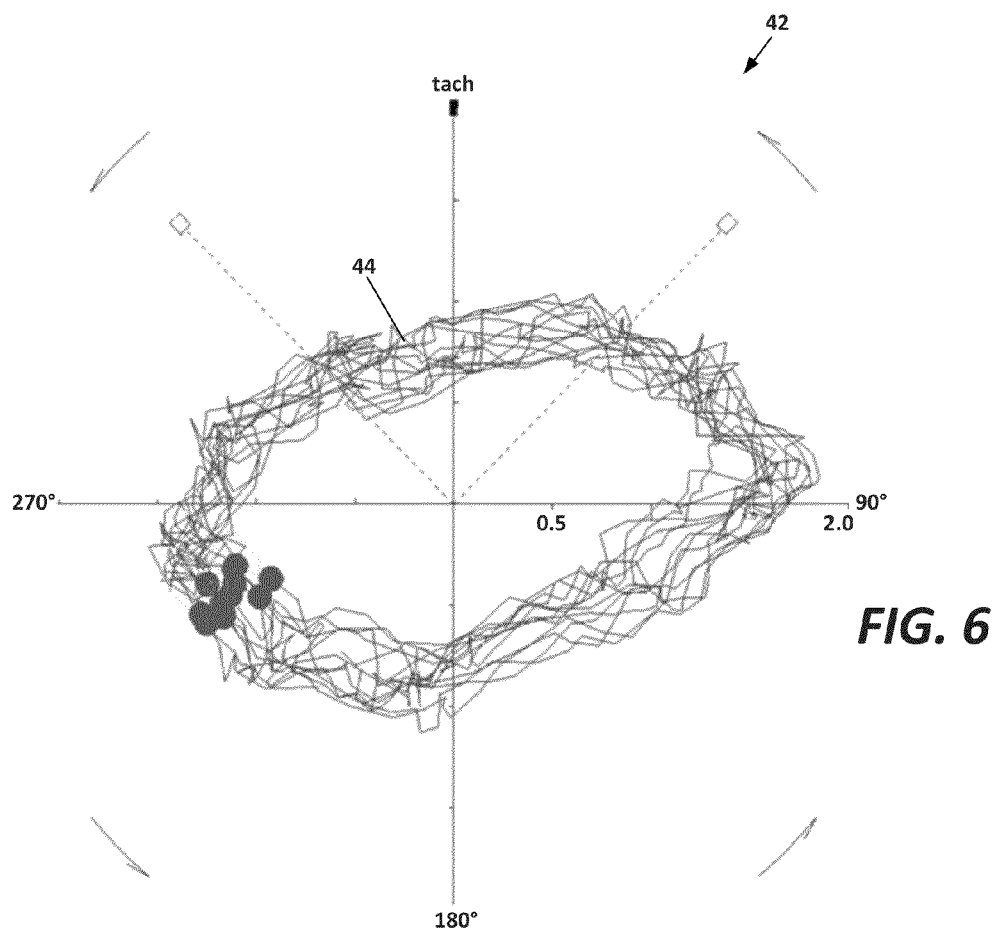
FIG. 6 depicts a shaft centerline orbit plot.
Figure 7:
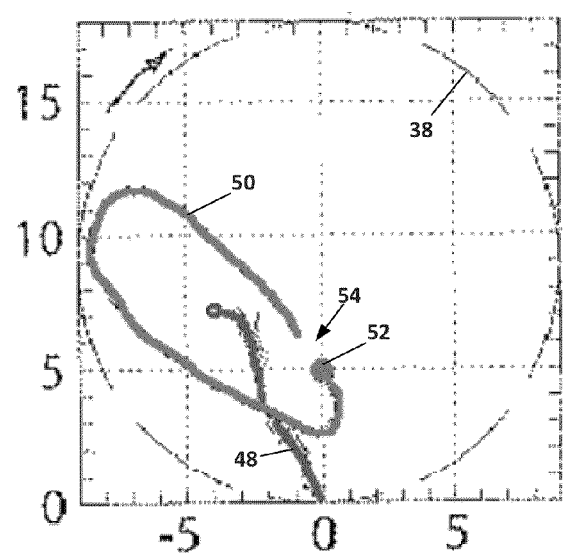
FIG. 7 depicts a shaft centerline orbit plot superimposed on an average shaft centerline plot.

FIG. 7 is an example of a plot 46 that combines the average shaft centerline as the shaft spins up to speed (such as depicted in FIG. 5) with the dynamic motion of the shaft center (such as depicted in FIG. 6) at a single sleeve bearing location along the length of the shaft after the shaft has reached a constant speed of 3600 RPM. The trail of data points 48 indicates the position of the average shaft centerline over a period of time as the shaft spins up, and the substantially oval shaped ring of data points 50 indicates the absolute motion of the shaft center about the average shaft centerline for a period of time after reaching constant speed. The dot 52 represents a reference position on the shaft. If this reference mark moves to a substantially different position in the ring of data points 50, this indicates that the vibration has changed phase. A blank space 54 leads the dot 52 to indicate the direction of the vibration. For simplicity of illustration, the plot 46 depicts data 50 for only one rotation of the shaft. The dashed circle 38 represents the clearance circle corresponding to the position of the inside surface of the sleeve bearing.

Embodiments of the present invention use data similar to that depicted in FIG. 7 for a single bearing location to construct a 3-dimensional model showing dynamic motion of a shaft center around an average shaft center position at multiple bearing locations along a rotating shaft. This 3-dimensional model is constructed by the modeling application 28 that performs data collection, analysis and graphing steps as shown in FIG. 2.

Figure 2:
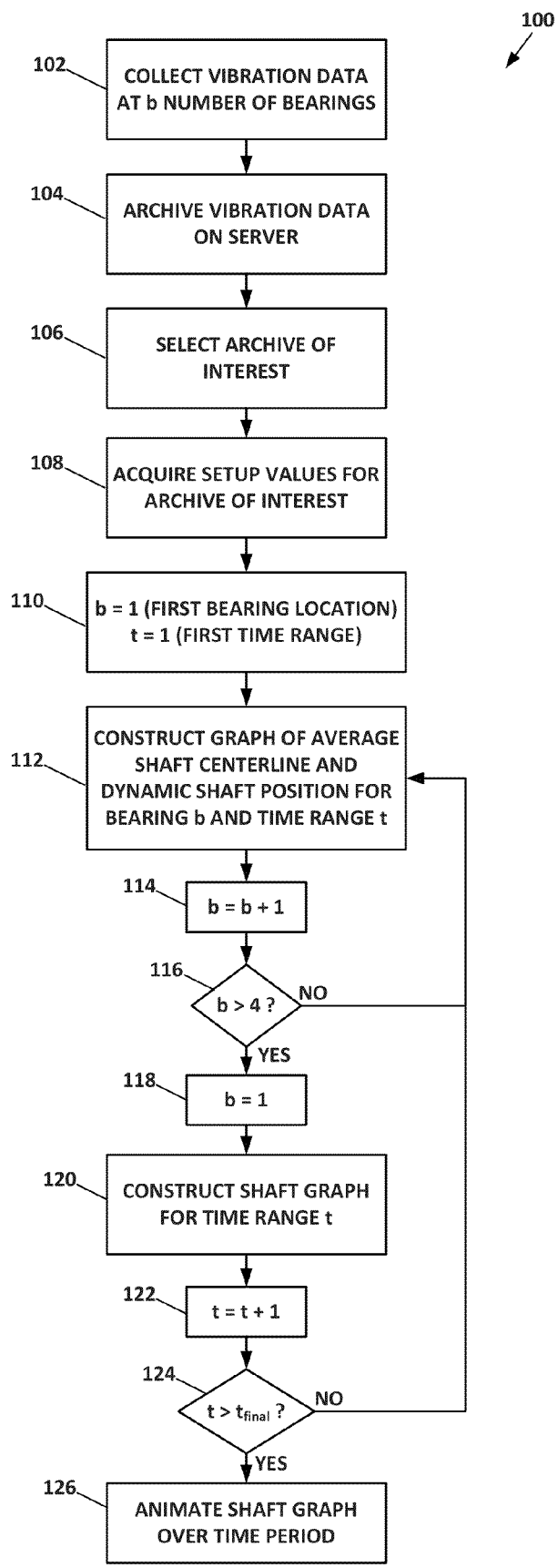
FIG. 2 depicts a method for modeling shaft vibration according to an embodiment of the invention.

As shown in FIG. 2, a modeling process 100 begins with the collection of shaft displacement data in two axes from the displacement probes 12a-12h at the four bearings 14a-14d over a time period of $t_1$ to $t_{final}$ (step 102). As discussed above, this data may be collected using the data collection device 60. Tachometer data from the tachometer 16 is also collected over the time period. The displacement data and tachometer data are preferably transferred to the server computer 64 where they are archived (step 104) until subsequent graphing and animation steps are performed. Alternatively, as discussed in more detail hereinafter, the graphing and animation steps may be performed substantially in real-time or "quasi real-time" based on the displacement data and tachometer data. Data from the probes 12a and 12b are examples of "first x-axis data" and "first y-axis data," and data from the probes 12c and 12d are examples of "second x-axis data" and "second y-axis data."

Figure 9:
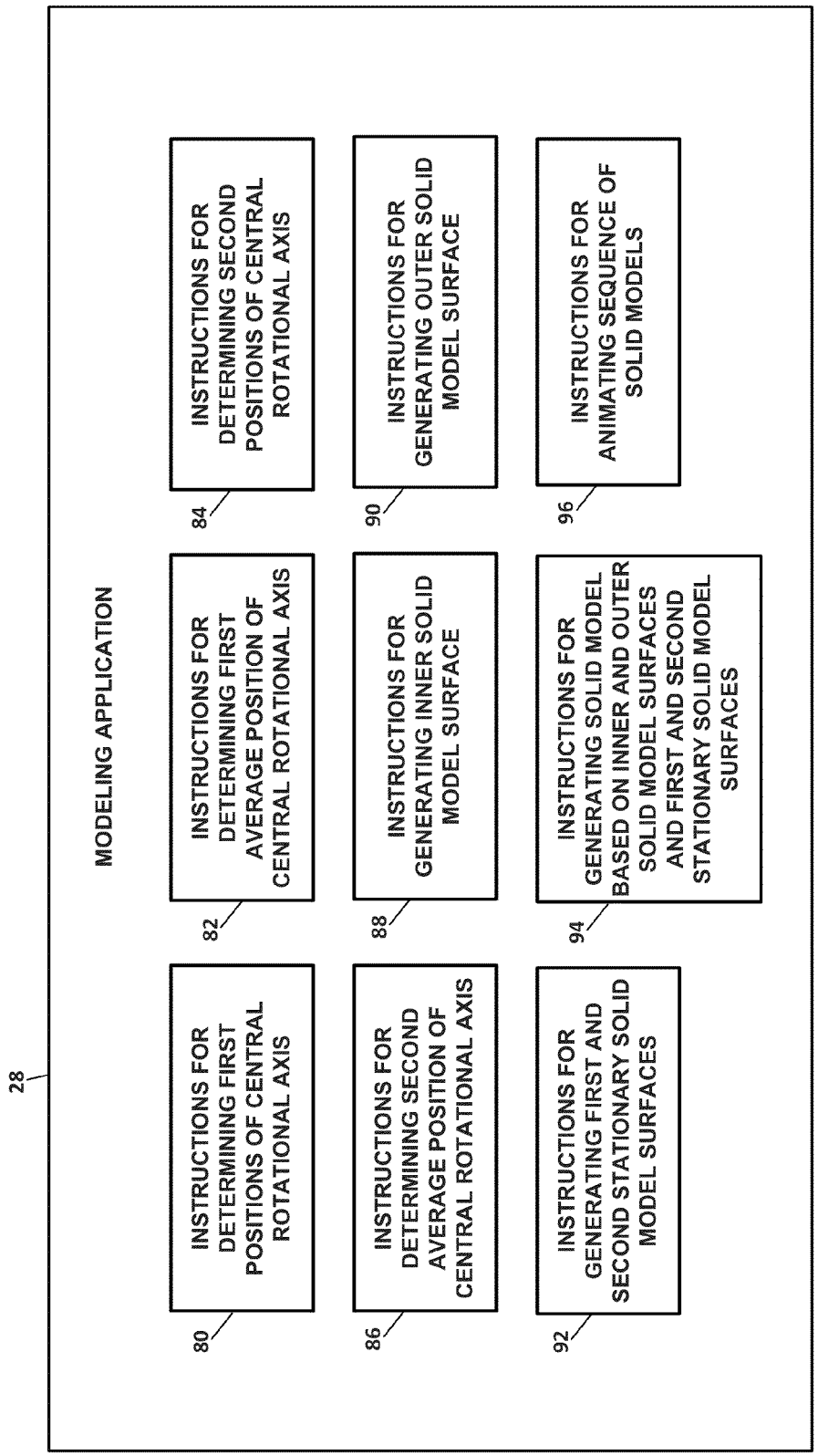
FIG. 9 depicts components of a 3-dimensional modeling application according to a preferred embodiment.

Using the data analysis computer 66, a user executes the modeling application 28 which comprises computer-executable instructions for performing some or all of the following steps. FIG. 9 depicts a block diagram representation of a preferred embodiment of the modeling application 28. In this embodiment, the application 28 includes instructions 80 for determining first positions of the central rotational axis of the shaft 30, instructions 82 for determining first average positions of the central rotational axis, instructions 84 for determining second positions of the central rotational axis, instructions 86 for determining second average positions of the central rotational axis, instructions 88 for generating an inner solid model surface, instructions 90 for generating an outer solid model surface, instructions 92 for generating first and second stationary solid model surfaces, instructions 94 for generating a solid model based on the inner and outer solid model surfaces and the first and second stationary solid model surfaces, and instructions 96 for animating a sequence of the solid models. These various sets of computer-executable instructions are described in more detail hereinafter.

In one embodiment, the user first selects a data archive of interest stored on the server computer for analysis using the user input device 24 or other means (step 106). In an alternative embodiment discussed hereinafter, the user may choose to model data collected in real-time. As the term is used herein, a data archive is a group of related transient waveform data sets (x-y displacement data as a function of time). The waveform data and the setup data (probe resting voltages and bearing clearance) for the selected archive are then transferred to the data analysis computer 66 from the server computer 64 (step 108). The modeling application 28 then constructs graphs of average shaft centerline position and dynamic shaft centerline movement around the average shaft centerline for each of the bearing positions (designated b=1 to b=4) for multiple time ranges (designated as t=1 to t=$t_{final}$) over the time period covered in the selected data archive. As noted previously, the use of four bearings in this example is completely arbitrary. More or fewer bearings may be modeled using embodiments of the invention.

For example, using displacement data from the probes 12a-12b on the first bearing 14a (b=1) generated during a first time range (t=1) (step 110), the modeling application 28 constructs a first graph of average shaft centerline and dynamic shaft centerline movement (step 112), similar in format to the graph depicted in FIG. 7. This first graph is stored in memory, and the process is repeated for the next bearing 14b (b=2) (steps 114 to 116 to 112). This graph construction process continues for the remaining bearing locations (until b>4 (step 116)), at which point b is set back to 1 (step 118). At this point in the present example, the modeling application 28 has constructed four graphs synchronized in the first time range (t=1), each similar in format to the graph depicted in FIG. 7.

Although the example embodiment described herein includes four bearing locations, it should be appreciated that the modeling processes described herein may be applied for systems incorporating more or fewer bearing locations. Thus, the invention is not limited to any particular number of bearing locations.

Figure 8A:
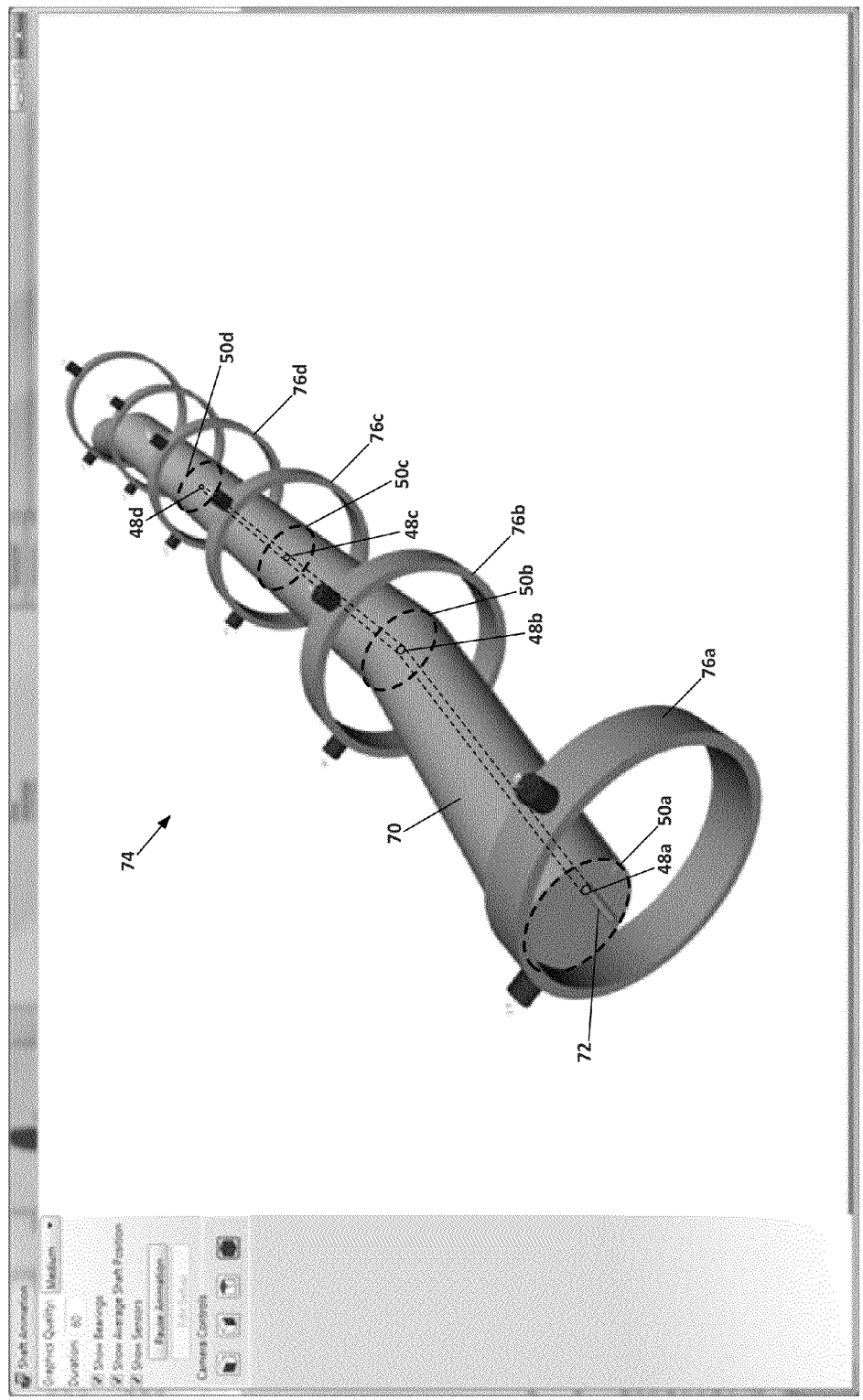
FIGS. 8A and 8B depict 3-dimensional shaft model displays according to a preferred embodiment.
Figure 8B:
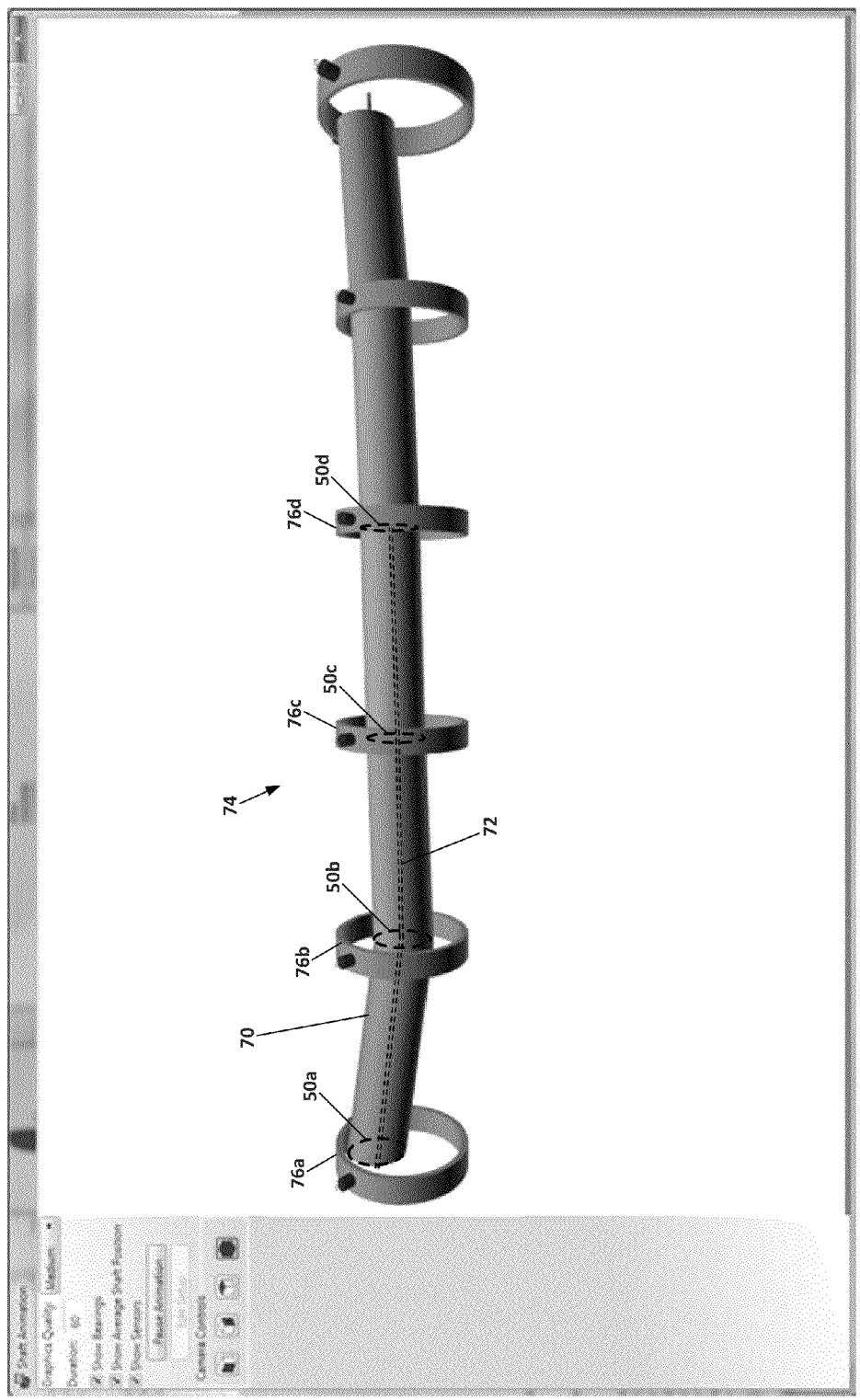

Based on the four 2-dimensional graphs constructed at step 112, the modeling application 28 constructs a 3-dimensional "solid" model 74 of dynamic shaft movement during the first time range for display on the display device 26 (step 120). An example of the model 74 is depicted in FIGS. 8A and 8B. This graph includes solid model depictions of rings 76a-76d that represent the four sleeve bearings (14a-14d). The rings 76a and 76b are examples of a "first stationary solid model surface" or "first cylinder," and a "second stationary solid model surface" or "second cylinder." The inside surface of the solid-model rings 76a-76d corresponds to the clearance circle 38 as shown in FIG. 7. The large segmented tube 70 in FIGS. 8A and 8B (also referred to herein as an "outer tube") represents the dynamic movement of the shaft centerline around the average shaft center over the first time range at each bearing location. Each segment of this tube 70 is a cylinder-like surface that connects a "ring" of data (such as 50a) representing the dynamic shaft movement at one bearing to a "ring" of data (such as 50b) at an adjacent bearing. The ring 50a is also referred to herein as a "first ring of data," and the ring 50b is also referred to herein as a "second ring of data." The small segmented tube 72 (also referred to herein as an "inner tube") represents the position of the average shaft center over the first time range at each bearing location. Each segment of this tube 72 is a cylindrical surface that connects the average shaft center position (such as 48a) at one bearing to the average shaft center position (such as 48b) at an adjacent bearing.

The solid model 74 depicted in FIGS. 8A and 8B provides a 3-dimensional view of the average shaft center position and the clearance between the outer surface of the shaft and the inner surface of the sleeve bearing at each bearing. For example, the tube 72 is significantly displaced from the center of the ring 76a and the outer surface of the tube 70 appears to be contacting, or very nearly contacting, the inner surface of the ring 76a. This indicates that the average shaft center position is significantly displaced from the center of the bearing 14a, resulting in little or no clearance between the outer surface of the shaft and the inner surface of the bearing 14a at certain rotational positions of the shaft. However, the clearance is much greater at the bearing 14b, mainly due to the shaft average center being nearly aligned with the center of the bearing.

Thus, the model 74 helps the user visualize whether the rotating shaft is about to contact a stationary element (bearing surface) in the radial direction. It also helps the user visualize whether the shaft is running in the appropriate region of its supporting bearings. It also shows shape information for shaft bending modes in absolute terms. This information can be used in multiple ways. At slower speeds, the dynamic forces acting on the shaft are relatively weak, thus the position of the shaft in the bearings provides an estimate of the alignment state of the bearings supporting the shaft or possibly an indication of a bent shaft. At higher speeds (assuming the bearings are in proper alignment), observation of the shape of the shaft as it rotates gives the user an estimate of the three-dimensional mode shape of the shaft.

With reference again to FIG. 2, the modeling application 28 repeats the process of constructing a 2-dimensional graph of average shaft centerline and dynamic shaft position for each of the four bearing positions for the next incremental time range (t=t+1) (steps 122 to 124 to 112 and repeating the loop). Based on these graphs, the modeling application 28 constructs the 3-dimensional model 74 for the next incremental time range (step 120). This process repeats for each incremental time range through the final time range represented in the selected data archive (t>$t_{final}$)(step 124). For example, time ranges may be as small as 0.05 seconds or as large as 25 seconds. The user may select an option to animate the model 74, which causes the modeling application 28 to sequentially "play" the individual models 74 constructed for each time period (step 126).

Various embodiments discussed herein are directed to a shaft rotating within sleeve bearings, where the clearance between the two is a known quantity. These embodiments model the physical proximity of the rotating shaft with respect to the stationary bearing. A similar approach could be taken to model a rotating element attached to a shaft, such as turbine blades, and show the clearance between the rotating element and a stationary element, such as a turbine housing. The user would be able to tell if the rotating element was about to contact the stationary element in which it rotates. Thus, the rotating structure may be a shaft or turbine blades or any other structure rotating about a rotational axis, and the stationary structures may be sleeve bearings or turbine housings or any other stationary structures that are disposed near the rotating structure.

Embodiments of the invention may also be used to model movement of a shaft/rotor system in the axial direction. This involves use of an axial displacement probe for measuring distance between the probe and a thrust collar attached to the shaft. As operating conditions of the rotor change, the rotor may move axially. This model may be used to indicate whether the shaft is about to contact a stationary component in the axial direction. Modeling of axial displacement may also be used to discern and differentiate particular anomalous conditions, such as angular misalignment and thermal growth.

Preferred embodiments of the invention combine synchronized and unfiltered data at each sensor location to accurately model the behavior of the entire shaft inside its bearings. The user can display this animation for different parts of a transient event to observe the shaft behavior at each state. This approach allows the user to specify the duration of the animation to effectively slow down the modeled movement of the animated shaft. This is often important since a shaft can rotate at speeds of sixty revolutions per second (for example), and at such speeds it would be difficult to comprehend the shaft behavior, especially the dynamic motion about the shaft center.

The embodiments described above use synchronized time-base data (time waveforms) from each displacement probe. An alternate approach would be to use peak/phase data to model the shaft movement. This is a vector-based approach, where amplitude and phase values from each sensor are calculated, and a filter is applied at a particular multiple of the shaft turning speed. This approach eliminates the need to have all of the signals from all of the probes synchronized. This approach may be implemented using a portable data collector without multi-channel capabilities. However, it may only be used model the shaft motion at an integer multiple of the shaft rotational speed, instead of the complete motion of the shaft.

In preferred embodiments, the modeling application 28 is executed on the processor 20 of the data analysis computer 66. However, it will be appreciated that the modeling application could be executed on the processor 62 of the data collection device 60, on a processor in the server 64, or on any other processor having access to the displacement data. Thus, the invention is not limited to executing the modeling application 28 on any particular computer processor.

Figure 10:
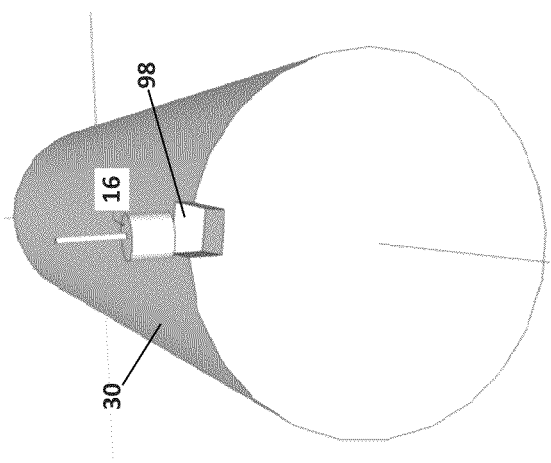
FIG. 10 depicts a tachometer sensor and shaft keyway according to a preferred embodiment.

In some embodiments, such as depicted in FIG. 10, the tachometer 16 is a proximity probe that senses distance to the shaft 30, and it is positioned over a keyway 98 that is machined into the surface of the shaft. Due to the keyway 98, the displacement signal from the probe has a distinctive once-per-revolution pattern which may be used to calculate revolutions per minute.

Figure 11B:
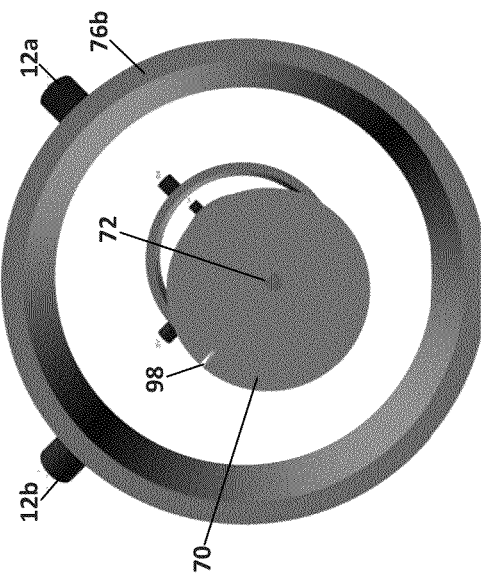
FIGS. 11A and 11B depict 3-dimensional shaft model displays with depiction of a shaft keyway according to a preferred embodiment.
Figure 11A:
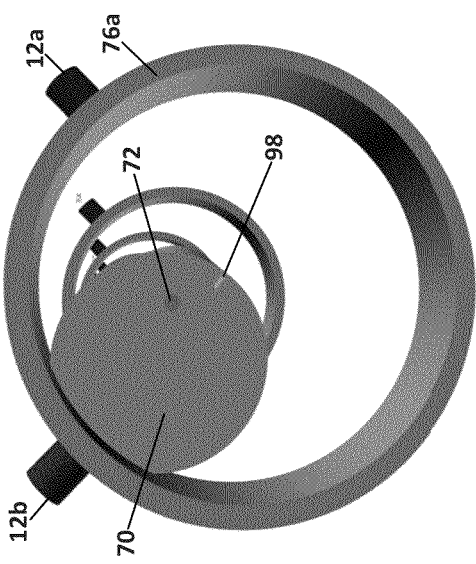

As shown in FIGS. 11A and 11B, the position of the keyway 98 may be represented in the solid model 74 to show the rotational position of the shaft 30 relative to the tachometer 16. This provides a visual way to indicate phase. If the highest vibration (shaft closest to the bearing) corresponds to the location of the tachometer 16, then the vibration would be in phase with the rotation of the shaft (phase of 0 degrees).

When the rotational speed of the shaft 30 changes, the phase of the vibration often changes. FIGS. 11A and 11B show the shaft rotating at two different speeds. Both figures show the point in the shaft's rotation when the displacement sensors 12a-12b detect the highest magnitude of vibration. However, it is apparent that there is a difference of about 180 degrees in the position of the keyway 98 in the two figures. Thus, the model 74 gives the analyst a visual indication of phase that can be compared for different speeds. Changes in phase indicate that the shaft 30 probably went through a resonance and is operating in a different shape/bending mode.

As described above, in some embodiments of the invention, the modeling application operates on displacement data stored in a data archive. In alternative embodiments, the operations described above may be performed in real-time or "quasi real-time" as displacement data is collected from the displacement probes. The term "quasi real-time" as used herein indicates that data may be buffered in memory for a very short time between the time of data collection and the time of execution of the graphic modeling steps which generate the 3-dimensional model. This buffer memory may be implemented in the data collection device 60, in the server computer 64 or in the data analysis computer 66.

When a shaft is rotating at high speed, such as 3600 RPM for example, the actual excursion of the shaft as it rotates in real-time is impossible for the human eye to clearly see. A real-time 3-dimensional model at such speeds would appear merely as a blur on the display. To make a real-time display useful, embodiments of the invention display an envelope representing the maximum excursion of a fast rotating shaft. Alternatively, a quasi real-time model of buffered portions of the displacement data may be played in "slow motion" on the device to make it useful for observation. For example, data collected over five seconds for a shaft turning at 3600 RPM may be displayed in slow motion over a period of five minutes.

In some embodiments, the 3-dimensional modeling technique described herein may be used in a dynamic multi-plane balancing analysis which considers just the 1×RPM component of the vibration signal. The 1×RPM component of the vibration signal provides an indication of a portion of a shaft that is heavier than other portions which causes imbalance during shaft rotation. To obtain the substantially sine wave 1×RPM component, the higher frequency components of the vibration signal are filtered out. In these embodiments, the 3-dimensional model is animated using only the 1×RPM component to clearly show any "wobble" of the shaft caused by weight imbalance.

The filtered sine wave could also be represented as a vector. For example, a velocity vector of 0.5 in/sec at 30 degrees indicates that the highest amplitude of the sine wave is 0.5 in/sec and the highest amplitude occurs at 30 degrees of shaft rotation after the point at which the tachometer is triggered. This vector data is much easier to acquire since the displacement measurements do not have to be simultaneous.

The balancing analysis using 3-dimensional modeling may also be performed using data collected from casing probes, which are less invasive than proximity probes. Casing probes, which the user simply holds on the machine case, measure the force generated by the shaft vibration rather than displacement of the shaft.

In some embodiments, the 3-dimensional modeling technique described herein may be used to depict misalignment between multiple shafts coupled together via a coupling of some sort. Misalignment, which is the condition wherein two or more coupled shafts are not collinear, would be visually obvious in the 3-dimensional animation generated by the modeling application. Such an animation for misalignment could also be generated using peak/phase vector data collected using unsynchronized casing probes, such as described above. In the case of offset misalignment, the shaft centerlines depicted in the animation would be parallel, but not collinear. In the case of angular misalignment, the shaft centerlines would be neither collinear nor parallel, but they would intersect. There could also be a situation where offset misalignment and angular misalignment are both indicated. Angular misalignment typically contributes to axial displacement to a greater magnitude than either imbalance or offset misalignment.

Embodiments described herein further assist a user by providing a graphical representation, such as a graphical pseudo-tachometer, to visually represent at least 1×RPM. These embodiments also permit the user to see or even select a 2×RPM or other-harmonic strobe-like indicator. Alternatively, a graphical stopwatch that repeats with each shaft revolution may be displayed showing phase time (in milliseconds or other units) or angle (in degrees or radians or other units) approximating a revolution of the graphically rotating shaft. In addition to the graphical observation of the rotor turning, this assists the user in interpreting shaft motion by physically quantifying an actual delta-time between one angular position and another. It also allows for distinguishing 1×RPM faults from 2×RPM faults from sub-synchronous faults.

In some embodiments, a self-check validation calculation may be programmed and computed in association with the graphic centerline visualization to assist or alert an operator who is considering acting on information gained from the centerline visualization. For example, one or more of the visualization techniques described herein may be combined with other information using well known laws of physics or an empirical model (or an approximation of such) to display further information that would be valuable to an operator. For example, a centerline visualization of a rotating component may provide evidence of an interference or rubbing condition. To verify this, a calculation may be used to estimate a physical consequence, such as a force or a temperature or damage estimate, which will indicate that such an interference condition is actually occurring. Thus, such a calculation can be useful to confirm or refute the validity of visualization information.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for generating a computer-displayable solid model representation of movement over a period of time of a rotating structure with respect to a first stationary structure and a second stationary structure, wherein the first and second stationary structures are disposed near the rotating structure and spaced apart from each other along a central rotational axis of the rotating structure, the system comprising:
    a computer processor for accessing displacement data indicative of a spatial relationship between the rotating structure and the first and second stationary structures, the displacement data comprising:
        first x-axis data indicative of a distance in a first x-axis between a first surface of the rotating structure and a surface of the first stationary structure that is adjacent the first surface of the rotating structure;
        first y-axis data indicative of a distance in a first y-axis between the first surface of the rotating structure and the surface of the first stationary structure;
        second x-axis data indicative of a distance in a second x-axis between a second surface of the rotating structure and a surface of the second stationary structure that is adjacent the second surface of the rotating structure; and
        second y-axis data indicative of a distance in a second y-axis between the second surface of the rotating structure and the surface of the second stationary structure; and
    a solid modeling application that is operable for execution by the computer processor, the solid modeling application comprising:
        computer-executable instructions which, when executed, process the first x-axis data and the first y-axis data to determine first positions of the central rotational axis of the rotating structure with respect to the surface of the first stationary structure as the rotating structure rotates during a first time range during the time period;
        computer-executable instructions which, when executed, process the first positions of the central rotational axis to determine a first average position of the central rotational axis during the first time range, wherein the first positions of the central rotational axis during the first time range form a first ring of data points encircling the first average position of the central rotational axis;
        computer-executable instructions which, when executed, process the second x-axis data and the second y-axis data to determine second positions of the central rotational axis of the rotating structure with respect to the surface of the second stationary structure as the rotating structure rotates during the first time range;
        computer-executable instructions which, when executed, process the second positions of the central rotational axis to determine a second average position of the central rotational axis during the first time range, wherein the second positions of the central rotational axis during the first time range form a second ring of data points encircling the second average position of the central rotational axis;
        computer-executable instructions which, when executed, generate an inner solid model surface connecting the first average position of the central rotational axis with the second average position of the central rotational axis;
        computer-executable instructions which, when executed, generate an outer solid model surface connecting the first ring of data points with the second ring of data points, the outer solid model surface surrounding the inner solid model surface;
        computer-executable instructions which, when executed, generate a first stationary solid model surface representing the surface of the first stationary structure;
        computer-executable instructions which, when executed, generate a second stationary solid model surface representing the surface of the second stationary structure;
        computer-executable instructions which, when executed, generate the solid model representation of the movement of the rotating structure with respect to the first and second stationary structures during the first time range, wherein the solid model representation is operable to be displayed on a computer display device, the solid model representation comprising:
            the first stationary solid model surface;
            the second stationary solid model surface spaced apart from the first stationary solid model surface;
            the inner solid model surface extending between the first stationary solid model surface and the second stationary solid model surface; and
            the outer solid model surface extending between the first stationary solid model surface and the second stationary solid model surface.

2. The system of claim 1 wherein the computer processor is a component of a data analysis computer, a server computer or a data collection device.

3. The system of claim 1 wherein the first x-axis is substantially parallel with the second x-axis, and the first y-axis is substantially parallel with the second y-axis.

4. The system of claim 1 wherein the first x-axis is oriented at 90 degrees with respect to the first y-axis, and the second x-axis is oriented at 90 degrees with respect to the second y-axis.

5. The system of claim 1 further comprising:
    a first x-axis displacement probe disposed on the first stationary structure on the first x-axis for generating displacement versus time signals from which the first x-axis data is derived;

a first y-axis displacement probe disposed on the first stationary structure on the first y-axis for generating displacement versus time signals from which the first y-axis data is derived;
a second x-axis displacement probe disposed on the second stationary structure on the second x-axis for generating displacement versus time signals from which the second x-axis data is derived; and
a second y-axis displacement probe disposed on the second stationary structure on the second y-axis for generating displacement versus time signals from which the second y-axis data is derived.

6. The system of claim 1 wherein,
the inner solid model surface comprises an inner tube extending between and connecting the first average position of the central rotational axis and the second average position of the central rotational axis, and
the outer solid model surface comprises an outer tube extending between and connecting the first ring of data points and the second ring of data points, the outer tube surrounding the inner tube.

7. The system of claim 6 wherein
the first stationary solid model surface comprises a first cylinder surrounding a first portion of the outer tube at the first ring of data points, and
the second stationary solid model surface comprises a second cylinder surrounding a second portion of the outer tube at the second ring of data points.

8. The system of claim 7 wherein
spatial clearance between the outer tube and the first cylinder in the solid model representation corresponds to spatial clearance between the first surface of the rotating structure and the surface of the first stationary structure that is adjacent the first surface of the rotating structure, and
spatial clearance between the outer tube and the second cylinder in the solid model representation corresponds to spatial clearance between the second surface of the rotating structure and the surface of the second stationary structure that is adjacent the second surface of the rotating structure.

9. The system of claim 1 wherein the solid modeling application comprises:
computer-executable instructions which, when executed, process the first x-axis data and the first y-axis data to determine first positions of the central rotational axis of the rotating structure with respect to the surface of the first stationary structure as the rotating structure rotates during multiple sequential time ranges during the time period that are subsequent to the first time range;
computer-executable instructions which, when executed, process the first positions of the central rotational axis to determine first average positions of the central rotational axis during each of the multiple sequential time ranges;
computer-executable instructions which, when executed, process the second x-axis data and the second y-axis data to determine second positions of the central rotational axis of the rotating structure with respect to the surface of the second stationary structure as the rotating structure rotates during each of the multiple sequential time ranges;
computer-executable instructions which, when executed, process the second positions of the central rotational axis to determine second average positions of the central rotational axis during each of the multiple sequential time ranges;
computer-executable instructions which, when executed, generate the solid model representation of the movement of the rotating structure with respect to the first and second stationary structures during each of the multiple sequential time ranges; and
computer-executable instructions which, when executed, display the solid model representation for the first time range on a display device and subsequently display the solid model representation for each of the multiple sequential time ranges on the display device, thereby generating a time-sequence animation of the solid model representation.

10. The system of claim 1 wherein
the computer processor accesses the displacement data from a buffer memory substantially in real-time as the displacement data is acquired, and
the computer processor executes the computer-executable instructions of the solid modeling application substantially in real-time to generate the solid model as the displacement data is acquired.

11. The system of claim 1 wherein
the computer processor accesses the displacement data from a long-term storage device, and
the computer processor executes the computer-executable instructions of the solid modeling application to generate the solid model based on the displacement data accessed from the long-term storage device.

12. A system for generating a computer-displayable solid model representation of movement over a period of time of a rotating structure with respect to a first stationary structure and a second stationary structure, wherein the first and second stationary structures are disposed near the rotating structure and spaced apart from each other along a central rotational axis of the rotating structure, the system comprising:
a first x-axis displacement probe disposed on the first stationary structure for generating displacement versus time signals indicative of a distance in a first x-axis between a first surface of the rotating structure and a surface of the first stationary structure that is adjacent the first surface of the rotating structure;
a first y-axis displacement probe disposed on the first stationary structure for generating displacement versus time signals indicative of a distance in a first y-axis between the first surface of the rotating structure and the surface of the first stationary structure, wherein the first y-axis is oriented at 90 degrees with respect to the first z-axis;
a second x-axis displacement probe disposed on the second stationary structure for generating displacement versus time signals indicative of a distance in a second x-axis between a second surface of the rotating structure and a surface of the second stationary structure that is adjacent the second surface of the rotating structure, wherein the second x-axis is substantially parallel with the first x-axis; and
a second y-axis displacement probe disposed on the second stationary structure for generating displacement versus time signals indicative of a distance in a second y-axis between the second surface of the rotating structure and the surface of the second stationary structure, wherein the second y-axis is substantially parallel with the first y-axis;
an analog-to-digital converter for converting the displacement versus time signals from the first x-axis displacement probe, the first y-axis displacement probe, the second x-axis displacement probe, and the second y-axis displacement probe into first x-axis data, first y-axis data, second x-axis data, and second y-axis data, respectively;

a computer processor for accessing the first x-axis data, first y-axis data, second x-axis data, and second y-axis data; and a solid modeling application that is operable for execution by the computer processor, the solid modeling application comprising:

computer-executable instructions which, when executed, process the first x-axis data and the first y-axis data to determine first positions of the central rotational axis of the rotating structure with respect to the surface of the first stationary structure as the rotating structure rotates during a first time range during the time period;

computer-executable instructions which, when executed, process the first positions of the central rotational axis to determine a first average position of the central rotational axis during the first time range, wherein the first positions of the central rotational axis during the first time range form a first ring of data points encircling the first average position of the central rotational axis;

computer-executable instructions which, when executed, process the second x-axis data and the second y-axis data to determine second positions of the central rotational axis of the rotating structure with respect to the surface of the second stationary structure as the rotating structure rotates during the first time range;

computer-executable instructions which, when executed, process the second positions of the central rotational axis to determine a second average position of the central rotational axis during the first time range, wherein the second positions of the central rotational axis during the first time range form a second ring of data points encircling the second average position of the central rotational axis;

computer-executable instructions which, when executed, generate an inner solid model surface comprising an inner tube extending between and connecting the first average position of the central rotational axis and the second average position of the central rotational axis;

computer-executable instructions which, when executed, generate an outer solid model surface comprising an outer tube extending between and connecting the first ring of data points and the second ring of data points, the outer tube surrounding the inner tube;

computer-executable instructions which, when executed, generate a first stationary solid model surface representing the surface of the first stationary structure, the first stationary solid model surface comprising a first cylinder surrounding a first portion of the outer tube at the first ring of data points;

computer-executable instructions which, when executed, generate a second stationary solid model surface representing the surface of the second stationary structure, the second stationary solid model surface comprising a second cylinder surrounding a second portion of the outer tube at the second ring of data points;

computer-executable instructions which, when executed, generate the solid model representation of the movement of the rotating structure with respect to the first and second stationary structures during the first time range, wherein the solid model representation is operable to be displayed on a computer display device, the solid model representation comprising:

the first stationary solid model surface;
the second stationary solid model surface spaced apart from the first stationary solid model surface;
the inner solid model surface extending between the first stationary solid model surface and the second stationary solid model surface; and
the outer solid model surface extending between the first stationary solid model surface and the second stationary solid model surface,
wherein spatial clearance between the outer tube and the first cylinder in the solid model representation corresponds to spatial clearance between the first surface of the rotating structure and the surface of the first stationary structure that is adjacent the first surface of the rotating structure, and
wherein spatial clearance between the outer tube and the second cylinder in the solid model representation corresponds to spatial clearance between the second surface of the rotating structure and the surface of the second stationary structure that is adjacent the second surface of the rotating structure.

13. A method for generating a computer-displayable solid model representation of movement over a period of time of a rotating structure with respect to a first stationary structure and a second stationary structure, wherein the first and second stationary structures are disposed near the rotating structure and spaced apart from each other along a central rotational axis of the rotating structure, the system comprising:

(a) generating first x-axis data indicative of a distance in a first x-axis between a first surface of the rotating structure and a surface of the first stationary structure that is adjacent the first surface of the rotating structure;

(b) generating first y-axis data indicative of a distance in a first y-axis between the first surface of the rotating structure and the surface of the first stationary structure;

(c) generating second x-axis data indicative of a distance in a second x-axis between a second surface of the rotating structure and a surface of the second stationary structure that is adjacent the second surface of the rotating structure;

(d) generating second y-axis data indicative of a distance in a second y-axis between the second surface of the rotating structure and the surface of the second stationary structure;

(e) determining, based on the first x-axis data and the first y-axis data, first positions of the central rotational axis of the rotating structure with respect to the surface of the first stationary structure as the rotating structure rotates during a first time range during the time period;

(f) determining, based the first positions of the central rotational axis, a first average position of the central rotational axis during the first time range, wherein the first positions of the central rotational axis during the first time range form a first ring of data points encircling the first average position of the central rotational axis;

(g) determining, based on the second x-axis data and the second y-axis data, second positions of the central rotational axis of the rotating structure with respect to the surface of the second stationary structure as the rotating structure rotates during the first time range;

(h) determining, based on the second positions of the central rotational axis, a second average position of the central rotational axis during the first time range, wherein the second positions of the central rotational axis during the first time range form a second ring of data points encircling the second average position of the central rotational axis;

(i) generating an inner solid model surface connecting the first average position of the central rotational axis with the second average position of the central rotational axis;

(j) generating an outer solid model surface connecting the first ring of data points with the second ring of data points;

(k) generating a first stationary solid model surface representing the surface of the first stationary structure;

(l) generating a second stationary solid model surface representing the surface of the second stationary structure;

(m) generating the solid model representation of the movement of the rotating structure with respect to the first and second stationary structures during the first time range, the solid model representation comprising:
the first stationary solid model surface;
the second stationary solid model surface spaced apart from the first stationary solid model surface;
the inner solid model surface extending between the first stationary solid model surface and the second stationary solid model surface; and
the outer solid model surface extending between the first stationary solid model surface and the second stationary solid model surface; and (n) displaying the solid model representation on a computer display device.

14. The method of claim 13 further comprising:

(o) determining, based on the first x-axis data and the first y-axis data, first positions of the central rotational axis of the rotating structure with respect to the surface of the first stationary structure as the rotating structure rotates during multiple sequential time ranges during the time period that are subsequent to the first time range;

(p) determining, based on the first positions of the central rotational axis, first average positions of the central rotational axis during each of the multiple sequential time ranges;

(q) determining, based on the second x-axis data and the second y-axis data, second positions of the central rotational axis of the rotating structure with respect to the surface of the second stationary structure as the rotating structure rotates during each of the multiple sequential time ranges;

(r) determining, based on the second positions of the central rotational axis, second average positions of the central rotational axis during each of the multiple sequential time ranges;

(s) generating the solid model representation of the movement of the rotating structure with respect to the first and second stationary structures during each of the multiple sequential time ranges; and (t) displaying the solid model representation for each of the multiple sequential time ranges on the computer display device, thereby generating a time-sequence animation of the solid model representation.

15. The method of claim 13 wherein step (n) further comprises displaying the solid model representation on the computer display device to aid a user in visualizing one or more of:
a mode shape of the rotating structure at high speeds;
an alignment state of the first and second stationary structures with respect to the rotating structure a slow speeds;
axial movement of the rotating structure with respect to one or more of the first and second stationary structures;
whether the rotating structure is in danger of contacting one or more of the first and second stationary structures;
whether the rotating structure is positioned within an appropriate region with respect to one or more of the first and second stationary structures;
behavior of the rotating structure during a transient event; and
effects of an imbalance in the rotating structure.

16. A system for generating a computer-displayable solid model representation of movement over a period of time of a rotating structure with respect to a first stationary structure and a second stationary structure, wherein the first and second stationary structures are disposed near the rotating structure and spaced apart from each other along a central rotational axis of the rotating structure, the system comprising:
a first x-axis displacement probe disposed on the first stationary structure for generating first x-axis displacement versus time signals indicative of a distance in a first x-axis between a first surface of the rotating structure and a surface of the first stationary structure that is adjacent the first surface of the rotating structure;
a first y-axis displacement probe disposed on the first stationary structure for generating first y-axis displacement versus time signals indicative of a distance in a first y-axis between the first surface of the rotating structure and the surface of the first stationary structure;
a second x-axis displacement probe disposed on the second stationary structure for generating second x-axis displacement versus time signals indicative of a distance in a second x-axis between a second surface of the rotating structure and a surface of the second stationary structure that is adjacent the second surface of the rotating structure, wherein the second x- axis is substantially parallel with the first x-axis such that the first x-axis displacement versus time signals are rotationally synchronized with the second x-axis displacement versus time signals;
a second y-axis displacement probe disposed on the second stationary structure for generating second y-axis displacement versus time signals indicative of a distance in a second y-axis between the second surface of the rotating structure and the surface of the second stationary structure, wherein the second y-axis is substantially parallel with the first y-axis such that the first y-axis displacement versus time signals are rotationally synchronized with the second y- axis displacement versus time signals;
an analog-to-digital converter for converting the first x-axis displacement versus time signals, the first y-axis displacement versus time signals, the second x-axis displacement versus time signals, and the second y-axis displacement versus time signals into first x-axis data, first y-axis data, second x-axis data, and second y-axis data, respectively;
a computer processor for accessing the first x-axis data, first y-axis data, second x-axis data, and second y-axis data; and
a solid modeling application that is operable for execution by the computer processor to generate the solid model representation of the movement of the rotating structure with respect to the first and second stationary structures, wherein the solid model representation is operable to be displayed on a computer display device.

* * * * *